United States Patent
Kawka et al.

(10) Patent No.: US 7,335,276 B2
(45) Date of Patent: Feb. 26, 2008

(54) FORMATION OF ARAMID PAPER LAMINATE

(75) Inventors: Dariusz Wlodzimierz Kawka, Midlothian, VA (US); David Wayne Anderson, Chester, VA (US); Michael Joseph Brown, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 652 days.

(21) Appl. No.: 10/261,862

(22) Filed: Oct. 1, 2002

(65) Prior Publication Data

US 2004/0060655 A1    Apr. 1, 2004

(51) Int. Cl.
*B32B 37/00*    (2006.01)
(52) U.S. Cl. ............... 156/324; 156/209; 156/322; 427/314
(58) Field of Classification Search ......... 156/205, 156/209, 322, 324; 264/175; 427/314
See application file for complete search history.

(56) References Cited

U.S. PATENT DOCUMENTS

| | | | |
|---|---|---|---|
| 3,756,908 A | 9/1973 | Gross | |
| 4,606,264 A * | 8/1986 | Agronin et al. | 100/38 |
| 5,026,456 A | 6/1991 | Hesler et al. | |
| 5,320,892 A | 6/1994 | Hendren et al. | |
| 5,582,669 A | 12/1996 | Gove et al. | |
| 5,888,607 A * | 3/1999 | Seth et al. | 428/92 |
| 5,948,543 A | 9/1999 | Ootuka et al. | |

FOREIGN PATENT DOCUMENTS

| | | | |
|---|---|---|---|
| EP | 400494 A1 * | 12/1990 | |
| GB | 1 486 372 | 9/1977 | |
| JP | 07032549 A * | 2/1995 | |
| JP | 8-99389 | 4/1996 | |
| JP | 08199494 A * | 8/1996 | |
| WO | WO 94/21457 A | 9/1994 | |

OTHER PUBLICATIONS

Machine translation of JP 08199494, 2005.*
Machine translation of JP 07032549, 2004.*
English abstract for JP 07032549, 1995.*
Shields, pp. 252-253 of Adhesives Handbook, published 1970.*
Translation of JP 07032549, 2006.*
Translation for JP 08199494, 2006.*

* cited by examiner

Primary Examiner—John L Goff

(57) ABSTRACT

A method of forming a laminate of at least two layers including at least one aramid paper with at least one layer of polymer by calendering opposing surfaces of the aramid paper at different temperatures prior to laminate formation.

20 Claims, No Drawings

FORMATION OF ARAMID PAPER LAMINATE

BACKGROUND OF THE INVENTION

The present invention is directed to a process of forming an improved laminate of aramid paper and a polymer layer, preferably a laminate of two aramid papers separated by a polymer layer.

Japanese Patent Publication 8-99389 discloses formation of a laminate sheet of m-aramid paper and a polyester film employing calendering and rapid cooling of the formed laminate.

British Patent 1,486,372 discloses a metallic layer adhered to a nonwoven web of a blend of different staple fibers which have been compacted and held together with a matrix of film-forming high molecular polymeric binder material.

Hendren et al. U.S. Pat. No. 5,320,892 discloses a laminate for honeycomb structures formed from a core containing poly (m-phenylene isophthalamide) fibrids and outside layers of a floc and fibrids of poly (mphenylene isophthalamide).

Ootuka et al. U.S. Pat. No. 5,948,543 discloses formation of a laminate base material of aromatic polyamide fiber non-woven fabric formed from fibers of para-aramid and meta-aramid bonded with a resin binder.

Laminates made from aramid sheet(s) or paper(s) and polymer layer(s) are useful in transformers wherein the laminate serves as dielectric insulation material. Any improvement in the internal adhesion of the laminate or the tear or elongation at break properties of such laminates is desirable.

SUMMARY OF THE INVENTION

The present invention is directed to a process for forming a laminate comprising in order a layer of an aramid paper, a layer of polymer and a layer of an aramid paper comprising the steps of:

a) calendering an aramid paper between two rolls which differ by a temperature of at least 20 degree centigrade wherein a surface of the paper exposed to a lower roll temperature is more porous than an opposite surface exposed to a higher roll temperature, b) calendering an aramid paper between two rolls which differ by a temperature of at least 20 degrees centigrade wherein a surface of the paper exposed to a lower roll temperature is more porous than an opposite surface exposed to a higher roll temperature, c) applying polymer to the more porous surface of the aramid paper from step a) and d) laminating the aramid paper from step b) onto the polymer wherein the more porous surface of the aramid paper contacts the polymer.

Another embodiment of this invention is directed to a process for forming a laminate comprising in order a layer of an aramid paper, and a layer of polymer comprising the steps of:

a) calendering an aramid paper between two rolls which differ by a temperature of at least 20 degrees centigrade wherein a surface of the paper exposed to a lower roll temperature is more porous than an opposite surface exposed to a higher roll temperature, b) applying polymer to the more porous surface of the calendered aramid paper.

Other embodiments of this invention are directed to processes for forming laminates wherein the two calender rolls differ by a temperature of at least 50 degrees centigrade and preferably differ by at least 100 degrees centigrade.

DETAILED DESCRIPTION OF THE INVENTION

A starting material in the present invention is an aramid paper. As employed herein the term paper is employed in its normal meaning and it can be prepared using conventional paper-making processes and equipment and processes. Aramid fibrous material, i.e. fibrids and short fibers can be slurried together to form a mix which is converted to paper such as on a Fourdrinier machine or by hand on a handsheet mold containing a forming screen. Reference may be made to Gross U.S. Pat. No. 3,756,908 and Hesler et al. U.S. Pat. No. 5,026, 456 for processes of forming aramid fibers into papers.

The thickness of the aramid paper is not critical and is dependent upon the end use of the laminate as well as the number of aramid layers employed in the final laminate. Although the present invention may employ two layers, i.e. one aramid layer and one polymer layer, and preferably employs a three layers, i.e. two aramid paper layers and one polymer layer, it is understood that there is no upper limit in the number of layers or other materials which can be present in the final article. For illustration, a five layer laminate could be formed having a first aramid paper layer, a first polymer layer, an intermediate layer of a paper or a second polymer, a third polymer layer, and a second aramid paper layer. The aramid layers, intermediate layers, and polymer layers can be of different compositions.

As employed herein the term aramid means polyamide wherein at least 85% of the amide (—CONH—) linkages are attached directly to two aromatic rings. Additives can be used with the aramid and, up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. In the practice of this invention, the aramids most often used are: poly (paraphenylene terephthalamide) and poly (metaphenylene isophthalamide) with poly(metaphenylene isophthalamide being the preferred aramid.

Aramid paper can be calendered between two heated calendering rolls with the high temperature and pressure from the rolls increasing the bond strength of the paper. Calendering aramid paper in this manner also decreases the porosity of the of the paper and it is believed this results in poorer adhesion of the paper to polymer layers in laminates. Good layer adhesion is important in electrical insulation laminates to avoid delamination while in use. The present invention solves this adhesion problem of the aramid papers by use of a calendering method which allows each opposing surface of an aramid paper to differ in porosity. In formation of one laminate of this invention, two aramid papers are first calendered and then laminated using a polymer inner layer. Since the surface of the paper has a degree of porosity, the type of polymer layer is not considered critical to the present invention. Although both thermoplastic and thermosetting polymers can be used, thermoplastic polymers with a degree of flow at the elevated temperature of the laminating operation are preferred. Also the use of thermoplastic polymers provide an ease of application in the lamination since they can be applied in liquid form to the surface of the aramid paper during or prior to lamination. However, a pre-formed layer of a polymer including such as having thermoplastic or thermosetting characteristics may also be used. Pre-formed layers generally have a memory from their formation which can impact negatively the mechanical properties of the laminate, therefore use of liquid polymers is preferred.

The preferred polymer applied to the aramid paper in this invention is polyester and particularly polyethylene terephthalate (PET). The PET used may include a variety of comonomers, including diethylene glycol, cyclohexanedimethanol, poly(ethylene glycol), glutaric acid, azelaic acid, sebacic acid, isophthalic acid, and the like. In addition to these comonomers, branching agents like trimesic acid, pyromellitic acid, trimethylolpropane and trimethyloloethane, and pentaerythritol may be used. The PET may be obtained by known polymerization techniques from either terephthalic acid or its lower alkyl esters (e.g. dimethyl terephthalate) and ethylene glycol or blends or mixtures of these.

A list of common polymers that may also be used in this invention includes polyethylene naphthalates, polybutylenes terephthalates, polyetheretherketones (PEEK), polyetherketoneketones (PEKK), polyether sulfones, polyimides, polyetherimides, and aromatic liquid crystalline polyesters, or mixtures or blends of any of these.

In the calendering of an aramid paper it is further understood that the pressure of the calender rolls onto the paper is not critical. A higher roll pressure will generally result in a denser overall article. A desired degree of denseness will be dependent on the choice of the aramid as well as the end use of the final laminate.

However, criticality is present in the present invention in maintaining the two calender rolls at different temperatures for the aramid paper forming the laminate. It is understood that calendaring the papers between two rolls as used in this invention means the papers may be made in a single calendaring step between heated rolls having different temperatures, or may be made by first calendaring one surface of the sheet at one temperature and then the opposing surface with a second temperature. This difference in temperature directly results in a difference in the porosity of opposite surfaces of the aramid paper. A temperature difference of at least 20 degrees centigrade is necessary to obtain the advantages of the present invention. A more preferred temperature difference will be at least 50 degrees and in many cases will be at least 100 degrees.

The temperature of the two rolls will be dependent on the aramid or aramids employed to form the final laminate. Although in many cases the same aramid can be employed to form both outer surfaces of the laminate, different aramids are suitable for the outer surfaces. The selection of aramid will be dependent on the final use of the laminate. For purpose of illustration it is readily apparent that the characteristics of the surfaces of the laminate will help dictate the temperatures and difference in temperatures for the process for calendaring the paper. If a more compact outer surface of the aramid paper is necessary, then a higher roll temperature is applicable to contact this surface in the calendering. It is understood that the temperature in the heated rolls may be below the glass transition temperature of the aramid components in the paper. However, in a preferred mode at least one of the heated rolls will be at or above the glass transition temperature of the aramid.

In the following examples all parts and percentages are by weight and degrees are in centigrade unless otherwise indicated. Initial tear resistance was measure via elongation at break per ASTM D1004. Tear propagation resistance was measured via average tear load by ASTM D1938. In the examples that follow, the failure mechanism was determined by examination and observation of how the samples failed in the above test methods.

EXAMPLE 1

This example illustrates the preparation of improved calendered aramid papers for the laminate of this invention compared with laminates of the prior art and the effect that these improved papers had on the adhesion of polyester polymer to the papers.

Four laminates were made were made to illustrate the effect of paper calendaring conditions on the final laminate of this invention. Aramid paper comprised of 45% poly (m-phenylene isopthalamide) floc and 55% poly (m-phenylene isopthalamide) fibrids was made using conventional Fourdrinier paper making processes and equipment. The paper was then calendered at 800 pli between two rolls operating at four different sets of elevated temperatures to make four different calendered papers for lamination.

Paper A was differentially calendered between two rolls with one roll operating at a surface temperature of 360 degrees C. and the other roll operating at a surface temperature of 300 degrees C., creating a differentially calendered aramid paper having two different surfaces, one being more porous (from being in contact with the lower temperature roll) and the other being less porous (from being in contact with the higher temperature roll).

Paper B was differentially calendered between two rolls with one roll operating at a surface temperature of 360 degrees C. and the other roll operating at a surface temperature of 250 degrees C., creating a differentially calendered aramid paper having two different surfaces, one being more porous and the other being less porous. Paper C was differentially calendered between two rolls with one roll operating at a surface temperature of 360 degrees C. and the other roll operating at a surface temperature of 200 degrees C., creating a differentially calendered aramid paper having two different surfaces, one being more porous and the other being less porous. Paper D was calendered between two rolls with the two rolls operating at the same surface temperature of 360 degrees C., creating a calendered aramid paper having essentially identical surfaces with essentially identical porosity.

A heated press operating at 288 degrees C. was used to laminate poly (ethylene terephthalate) polyester polymer having an intrinsic viscosity of 0.60 dl/g between two sheets of each of calendered papers A, B, C, & D. For differentially calendered papers A, B, & C, the laminate was made with the polymer contacting the more porous surface of the calendered paper. The three-layer laminate was kept in the press for five minutes then cooled. The resulting polymer layer was 0.01 inches in thickness. No chemical, flame, heat, or corona treatment or similar activation of the paper surface was performed. Examination of laminates containing papers A, B, & C revealed the polymer melted and flowed between the calendered papers, and when tested these laminates had acceptable adhesion. These laminates failed cohesively, that is, the plane of failure was within the aramid paper. Examination of the laminate containing paper D revealed the polymer melted and flowed between the calendered papers, and when tested, this laminates did not have acceptable adhesion. This laminate failed adhesively, that is, the plane of failure was between the aramid paper and polymer layer.

EXAMPLE 2

This example illustrates the affect of the extrusion polymer intrinsic viscosity on final laminate properties.

Illustrative laminates of this invention were made as in Example 1 with the fours different sets of calendered papers made in Example 1, however, the polymer was applied by extruding molten poly (ethylene terephthalate) (PET) polyester polymer between two papers with the polymer contacting the more porous surface of the papers, and the polymer was a PET having an intrinsic viscosity of 0.65 dl/g or 0.80 dl/g. All the resulting laminates had a polymer layer of thickness of 0.005 inches. Examination of a laminate containing paper D (of the prior art) and PET polymer having an intrinsic viscosity of 0.65 dl/g revealed this laminate had unacceptable adhesive failure, i.e. failure between the paper and the polyester polymer, with slight force. Examination of a laminate made with differential calendered paper A and the same polymer revealed acceptable adhesion with adhesive failure only after moderate force was applied. Examination of laminates made with differentially calendered papers A, B, and C and PET polymer having an intrinsic viscosity of 0.80 dl/g revealed the higher viscosity polymer had an effect on the failure mode of the laminate. Specifically, a laminate made with differentially calendered paper A, which had been calendered with the lowest amount of temperature difference, had unacceptable adhesion, failing adhesively between the polymer and paper with only slight force required. A laminate made with differentially calendered paper C, which had been calendered with the greatest amount of temperature difference, had acceptable adhesion, failing cohesively, i.e. within the plane of the aramid paper. A laminate made with differentially calendered paper B, which had been calendered with a moderate amount of temperature difference, had acceptable adhesion, failing in a balanced but acceptable manner between adhesive and cohesive failure.

EXAMPLE 3

This example illustrates one embodiment of this invention. Laminates were made by extruding polyethylene terephthalate polyester polymer between two differentially calendered sheets as was done in Example 2, however the polymer was extruded in a manner which layered different intrinsic viscosity polymers between the two aramid papers. Specifically, the polymer layer consisted of three layers which were, in order, a layer of PET polymer having an intrinsic viscosity of 0.65 dl/g, a layer of PET polymer having an intrinsic viscosity of 0.80 dl/g, and a second layer of PET polymer having an intrinsic viscosity of 0.65 dl/g. The two outer layers of 0.65 dl/g polymer were each 15% of the total polymer layer thickness, while the 0.80 dl/g polymer was 70% of the total thickness. Two laminates were made with differentially calendered paper C, which had been calendered with the greatest amount of temperature difference. A first laminate was made with PET polymer having an intrinsic viscosity of 0.65 dl/g and then a second laminate was made with the three polymer layer mentioned above, with each laminate having a total polymer layer thickness of 0.005 inches. Examination of these laminates revealed they both performed similarity and had acceptable adhesion, failing cohesively, i.e. within the plane of the aramid paper. An attempt was made to make a similar 3-polymer layer laminate with the prior art paper D of the prior art however the molten polymer would not adhere to the prior art paper D so acceptable laminates were not produced.

What is claimed is:

1. A process for forming a laminate comprising in order a layer of an aramid paper,
   a layer of polymer and
   a layer of an aramid paper
   a) comprising the steps of calendering an aramid paper between two heated rolls each maintained at an elevated temperature which differ by a temperature of at least 20 degrees centigrade wherein a surface of the paper exposed to a lower roll temperature is more porous than an opposite surface exposed to a higher roll temperature,
   b) calendering an aramid paper between two heated rolls each maintained at an elevated temperature which differ by a temperature of at least 20 degrees centigrade wherein a surface of the paper exposed to a lower roll temperature is more porous than an opposite surface exposed to a higher roll temperature,
   C) applying polymer to the more porous surface of the aramid paper from step a) and
   d) laminating the aramid paper from step b) onto the polymer wherein the more porous surface of the aramid paper contacts the polymer.

2. The process of claim 1 wherein the aramid papers obtained from step a) and step b) are identical.

3. The process of claim 1 wherein the aramid papers obtained from step a) and step b) differ.

4. The process of claim 1 wherein the polymer application in step c) employs molten polymer.

5. The process of claim 1 wherein at least one of the papers of step a) and step b) comprises poly (m-phenylene isophthalamide).

6. The process of claim 1 wherein the polymer of step c) comprises poly (ethylene terephthalate) or copolymer thereof.

7. The process of claim 1 wherein the polymer is applied simultaneously to the surface of the papers at the nip of a pair of heated rolls.

8. The process of claim 1 wherein the temperature difference in at least one of a) and b) is at least 50 degrees centigrade.

9. The process of claim 1 wherein the temperature difference in at least one of a) and b) is at least 100 degrees centigrade.

10. The process of claim 1 wherein at feast one of the heated rolls in a) or b) is above the glass transition temperature of the aramid.

11. A process for forming a laminate comprising in order a layer of an aramid paper.
    a layer of polymer and
    a layer of an aramid paper comprising the steps of
    a) calendering an aramid paper between two heated rolls each maintained at an elevated temperature which differ by a temperature of at least 20 degrees centigrade wherein a surface of the paper exposed to a lower roll temperature is more porous than an opposite surface exposed to a higher roll temperature,
    b) calendering an aramid paper between two heated rolls each maintained at an elevated temperature which differ by a temperature of at least 20 degrees centigrade wherein a surface of the paper exposed to a lower roll temperature is more porous than an opposite surface exposed to a higher roll temperature,
    c) applying molten polymer to the more porous surfaces of the aramid paper from step a) and step b), and
    d) laminating the two papers and polymer together.

12. The process of claim 11 wherein the polymer is applied simultaneously to the surface of the papers at the nip of a pair of heated rolls.

13. The process of claim 11 wherein the polymer of step c) comprises polyethylene terephthalate or copolymer thereof.

14. A process for forming a laminate comprising In order
a layer of an aramid paper,
a first layer of polymer,
at least one intermediate layer, and
a second layer of an aramid paper comprising the steps of
- a) calendering an aramid paper between two heated rolls each maintained at an elevated temperature which differ by a temperature of at least 20 degrees centigrade wherein a surface of the paper exposed to a lower roll temperature is more porous than an opposite surface exposed to a higher roll temperature,
- b) calendering an aramid paper between two heated rolls each maintained at an elevated temperature which differ by a temperature of at least 20 degrees centigrade wherein a surface of the paper exposed to a lower roll temperature is more porous than an opposite surface exposed to a higher roll temperature,
- C) applying polymer to the more porous surface of the aramid paper from step a) and
- d) applying polymer to the more porous surface of the aramid paper from step b,
- e) laminating the aramid paper from steps (c) and (d) and the intermediate layer.

15. A process for forming a laminate comprising in order
a layer of an aramid paper,
a first layer of polymer,
at least one intermediate layer of polymer,
a second layer of polymer, and
a second layer of an aramid paper comprising the steps of
- a) calendering an aramid paper between two heated rolls each maintained at an elevated temperature which differ by a temperature of at least 20 degrees centigrade wherein a surface of the paper exposed to a lower roll temperature is more porous than an opposite surface exposed to a higher roll temperature,
- b) calendering an aramid paper between two heated rolls each maintained at an elevated temperature which differ by a temperature of at least 20 degrees centigrade wherein a surface of the paper exposed to a lower roll temperature is more porous than an opposite surface exposed to a higher roll temperature,
- c) applying the first and second layers of polymer with the intermediate polymer layer therebetween to the porous surface of the aramid paper from step a) and step b), and
- d) laminating the two papers and polymer layers together.

16. A process for forming a laminate comprising in order
a layer of an aramid paper, and
a layer of polymer and comprising the steps of
- a) calendering an aramid paper between two heated rolls each maintained at an elevated temperature which differ by a temperature of at least 20 degrees centigrade wherein a surface of the paper exposed to a lower roll temperature is more porous than an opposite surface exposed to a higher roll temperature,
- b) applying polymer to the more porous surface of the calendered aramid paper.

17. A process for forming a laminate of claim 15 wherein the two heated rolls differ by a temperature of at least 50 degrees centigrade.

18. A process for forming a laminate of claim 15 wherein the two heated rolls differ by a temperature of at least 100 degrees centigrade.

19. The process of claim 1 wherein the polymer of step c) comprises polyethylene naphthalate, polybutylene terephthalate, polyetheretherketone, polyetherketoneketone; polyether sulfone, polyimide, polyetherimide, aromatic liquid crystalline polyester, mixture or blend thereof.

20. The process of claim 11 wherein the polymer of step c) comprises polyethylene naphthalate, polybutylene terephthalate, polyetheretherketone, polyetherketoneketone, polyether sulfone, polyimide, polyetherimide, aromatic liquid crystalline polyester, mixture or blend thereof.

* * * * *